United States Patent [19]
Williams et al.

[11] Patent Number: 5,636,859
[45] Date of Patent: Jun. 10, 1997

[54] AIR BAG MODULE ASSEMBLY

[75] Inventors: Duane D. Williams, Beavercreek; Harold W. Morgan, Miamisburg, both of Ohio

[73] Assignee: General Motors Corporation, Detroit, Mich.

[21] Appl. No.: 554,908

[22] Filed: Nov. 9, 1995

[51] Int. Cl.$^6$ .................................................. B60R 21/16
[52] U.S. Cl. ........................................ 280/728.2; 280/731
[58] Field of Search ................................. 280/728.2, 731

[56] References Cited

U.S. PATENT DOCUMENTS

| | | |
|---|---|---|
| 3,844,527 | 10/1974 | Scott . |
| 4,148,503 | 4/1979 | Shiratori et al. . |
| 4,224,375 | 9/1980 | Veiga et al. . |
| 4,246,213 | 1/1981 | Takamatsu et al. . |
| 4,334,699 | 6/1982 | Patzelt et al. . |
| 4,548,919 | 10/1985 | Megna . |
| 4,590,219 | 5/1986 | Nissen et al. . |
| 4,852,907 | 8/1989 | Shiraki et al. . |
| 4,952,351 | 8/1990 | Parker et al. . |
| 4,964,653 | 10/1990 | Parker . |
| 5,002,307 | 3/1991 | Heidorn . |
| 5,013,064 | 5/1991 | Miller et al. . |
| 5,025,039 | 6/1991 | Neuhaus et al. . |
| 5,131,678 | 7/1992 | Gardner et al. . |
| 5,149,479 | 9/1992 | Nakajima . |
| 5,183,615 | 2/1993 | Zushi . |
| 5,201,541 | 4/1993 | Jones et al. ........................... 280/731 |
| 5,316,822 | 5/1994 | Nishijima et al. . |
| 5,334,340 | 8/1994 | Zushi . |
| 5,344,183 | 9/1994 | Hersman et al. . |
| 5,346,249 | 9/1994 | Hallard et al. . |
| 5,470,099 | 11/1995 | Williams . |
| 5,484,561 | 1/1996 | Weber et al. . |

FOREIGN PATENT DOCUMENTS

| | | |
|---|---|---|
| 2228235 | 8/1990 | United Kingdom . |
| WO95/10440 | 4/1995 | WIPO . |

*Primary Examiner*—Kenneth R. Rice
*Attorney, Agent, or Firm*—Kathryn A. Marra

[57] ABSTRACT

An air bag module assembly for attachment to a steering wheel is provided. The assembly includes an air bag subassembly including an air bag. A container is provided with the assembly for receiving the air bag subassembly therein. The assembly further includes a frame portion for attachment to the steering wheel. The container is snap-fittedly attached to the frame portion. Preferably, an outer material is formed as an integral one-piece covering over the frame portion and the container. The frame portion may include a plurality of bosses on the frame portion and a plurality of alternating tabs and notches on the container. The tabs each include an outwardly projecting hook portion. The bosses are received in the notches when the container is snapped on the frame portion and the hook portions are snapped onto the frame portion.

15 Claims, 3 Drawing Sheets

AIR BAG MODULE ASSEMBLY

This invention relates to an air bag module assembly having an improved container for holding an air bag therein.

BACKGROUND OF THE INVENTION

It is known in motor vehicles to provide a driver's side air bag module. The module typically includes a base plate and an air bag and inflator fastened to the base plate. It is also known to provide a unitary cover assembly to cover the air bag, inflator, and base plate. The cover assembly is made as a separate component and then is stretched out over the air bag and inflator for attachment to the base plate.

The cover assembly is made by providing a container and curing a foam covering on the outer surface of the container. The cover assembly includes weakened portions defined therein to permit deployment of the air bag. The cover assembly also must include slots at the corners to permit the walls to be spread apart when pulling the cover assembly over the air bag, and base plate during assembly. The container includes a plurality of inwardly turned container flanges which are fastened to the base plate. It is difficult during the molding process to keep the foam off the flanges for later attachment to the base plate. The air bag, inflator, and cover assembly are each attached to the base plate by fasteners to provide the air bag module. The module with the cover assembly thereon is then suitably mounted to the steering wheel of a vehicle.

This prior art cover assembly has the shortcoming of being a separate piece from the steering wheel. Thus, the prior art must match the color and gloss of the cover assembly with the steering wheel. In addition, the cover assembly is difficult to pull over and assemble to the air bag and base plate. The walls of the cover assembly including both the container and the outer foam must include the corner slots so that it can be bent and spread out to get over the air bag and come back to shape for attachment to the base plate. Sometimes the foam surface is marred during the assembly process and the cover assembly must be scrapped.

It is also known to provide a container which is attached to a one-piece integral steering wheel prior to continuously molding an outer material over the container and steering wheel. The container must be fastened to the steering wheel so that the container does not release from the steering wheel when the air bag deploys. Also, the container must be securely positioned for molding of the outer material. In the prior art, the cover is typically attached to the steering wheel by a plurality of fasteners which adds time and cost to the assembly process.

SUMMARY OF THE INVENTION

This invention solves the shortcomings of the prior art by providing an air bag module assembly having a container which is easily mounted by snap-fitted attachment. Advantageously, the present invention provides features which positively locate and lock the container in position on the assembly. Advantageously, the present invention provides secure attachment of the container without the use of fasteners. Thus, the container is securely positioned for operations involving applying the outer material over the container. The container is also securely positioned during deployment of an air bag out through the container and outer material. Advantageously, the container and the outer material do not need to be bent or manipulated to receive the air bag therein. Also, the container can either be a part of the steering wheel or can be later attached to the steering wheel as part of the air bag module.

These advantages are accomplished in the present invention by providing an air bag module assembly for attachment to a steering wheel. The assembly includes an air bag subassembly including an air bag. A container is provided with the assembly for receiving the air bag subassembly therein. The assembly further includes a frame portion for attachment to the steering wheel. The container is snap-fittedly attached to the frame portion. Preferably, an outer material is formed as an integral one-piece covering over the frame portion and the container.

In a preferred form, the assembly includes a plurality of bosses on the frame portion and a plurality of alternating tabs and notches on the container. The tabs each include an outwardly projecting hook portion. The bosses are received in the notches when the container is snapped on the frame portion and the hook portions are snapped onto the frame portion. Also preferably, the bosses each include an upper surface and an opposite lower surface. The container has notch edges engaging the upper surfaces of the bosses and the tabs extend between the bosses. The hook portions are snapped onto the frame portion between the lower surfaces of the bosses. Thus the bosses, notch edges, and hook portions cooperatively lock the container on the frame portion.

In addition, the air bag subassembly may include a base structure to which the air bag is attached. The base structure is preferably attached to the frame portion and the hook portions of the container are trapped between the base structure and the frame portion when the base structure is attached to the frame portion.

In accordance with another aspect of the invention, a method of making an air bag module assembly for attachment to a steering wheel is accomplished by providing an air bag subassembly including a base structure and an air bag attached to the base structure; by providing a frame portion having a receiving area; by inserting a container into the receiving area and snapping the container onto the frame portion; by inserting the air bag subassembly into the container; and by attaching the base structure of the air bag subassembly to the frame portion. Furthermore, the frame portion may be attached to the steering wheel. In addition, an outer material may be formed as one integral piece over the container and frame portion.

BRIEF DESCRIPTION OF THE DRAWINGS

An embodiment of the present invention is described, by way of example only, with reference to the accompanying drawings in which.

DESCRIPTION OF THE PREFERRED EMBODIMENT

Figure 1:
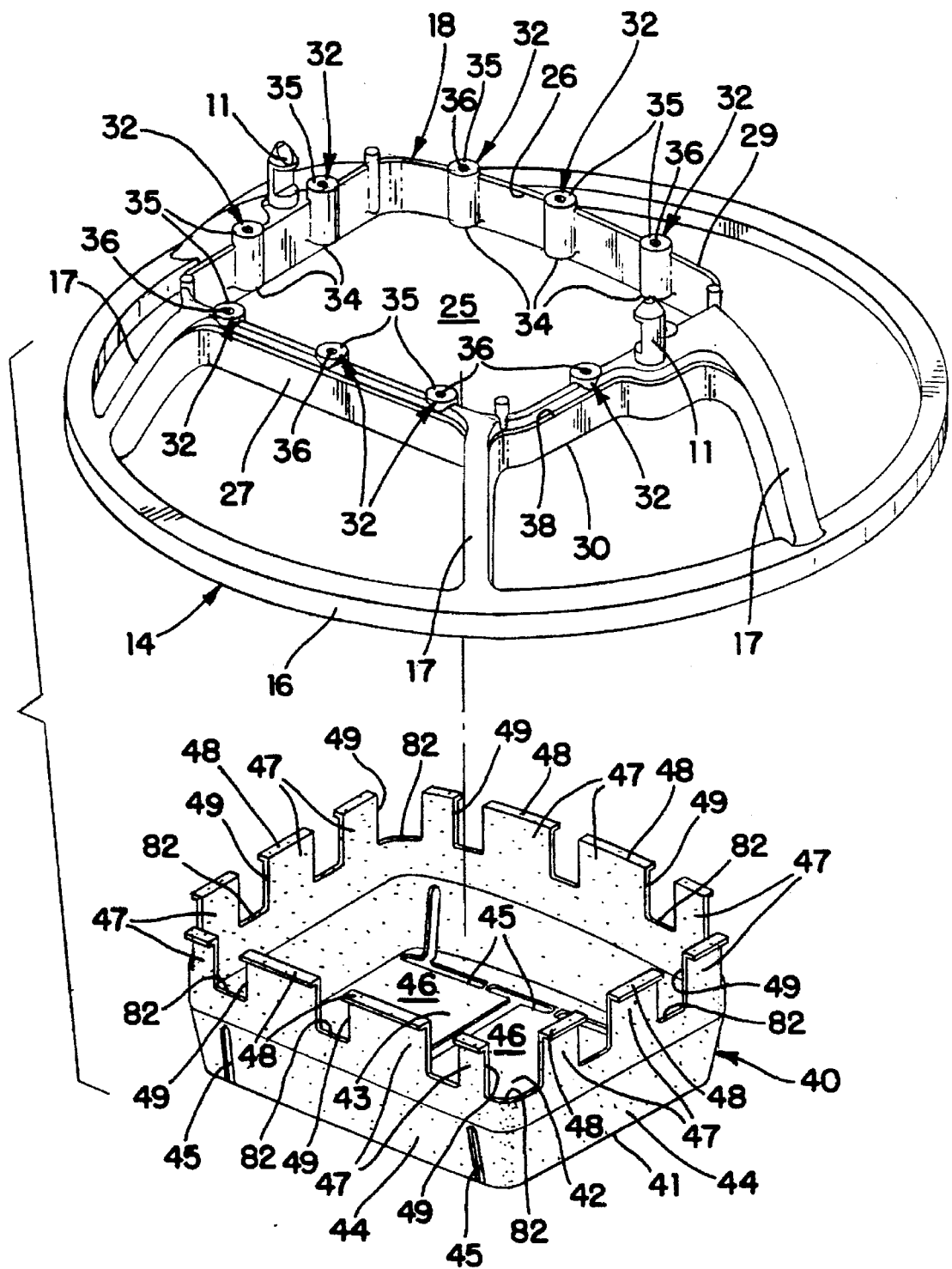
FIG. 1 is an exploded perspective view of a steering wheel having an integral center frame portion and a container.
Figure 2:
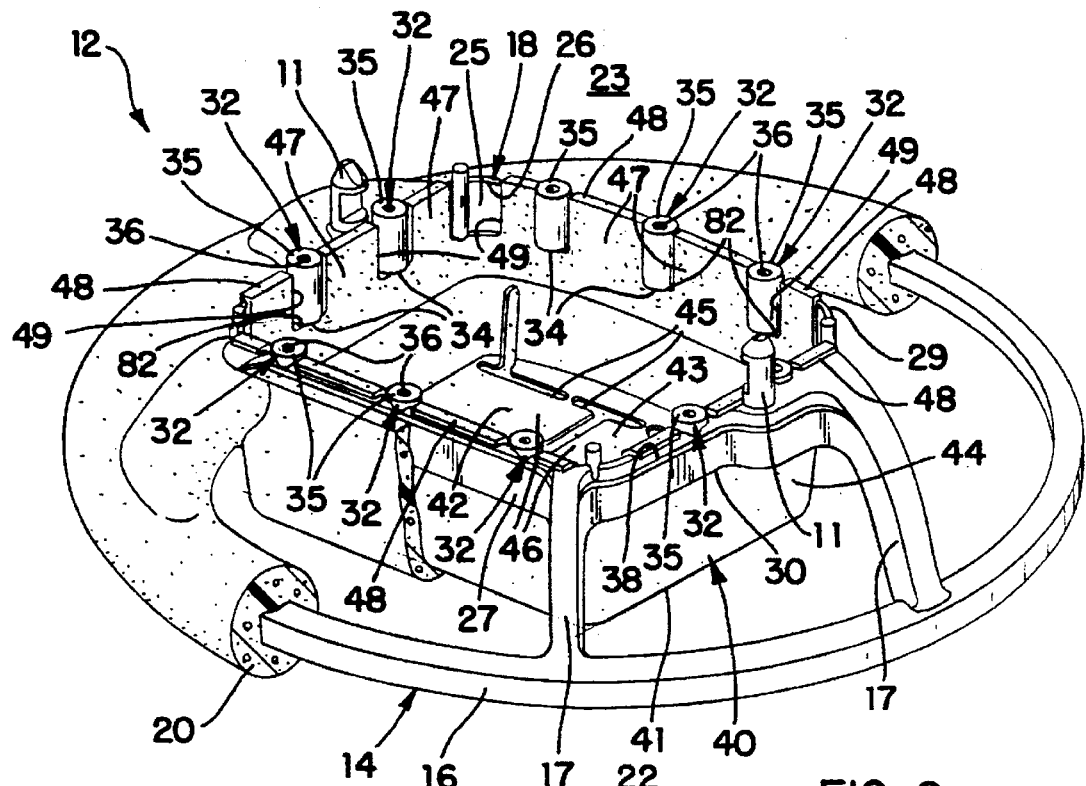
FIG. 2 is a perspective view of a steering wheel subassembly showing the container snapped onto the frame portion and showing a molded outer material partially broken away.
Figure 3:
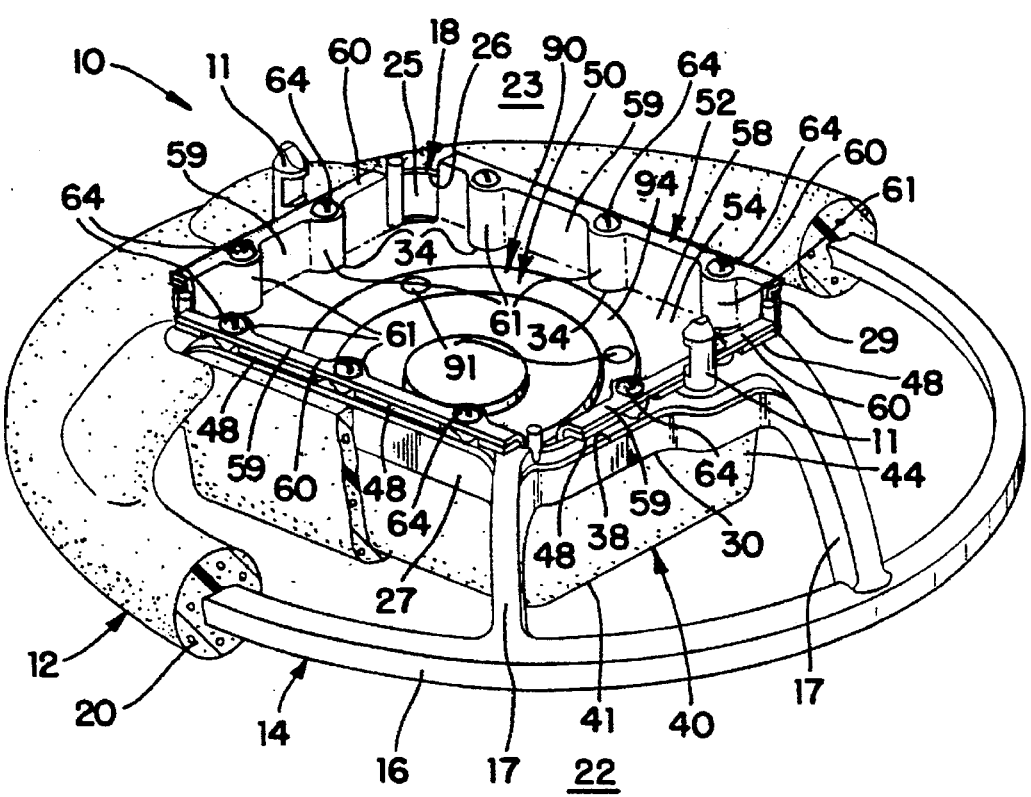
FIG. 3 is a perspective view of a steering wheel and air bag module assembly showing an air bag module subassembly assembled to the steering wheel subassembly.
Figure 4:
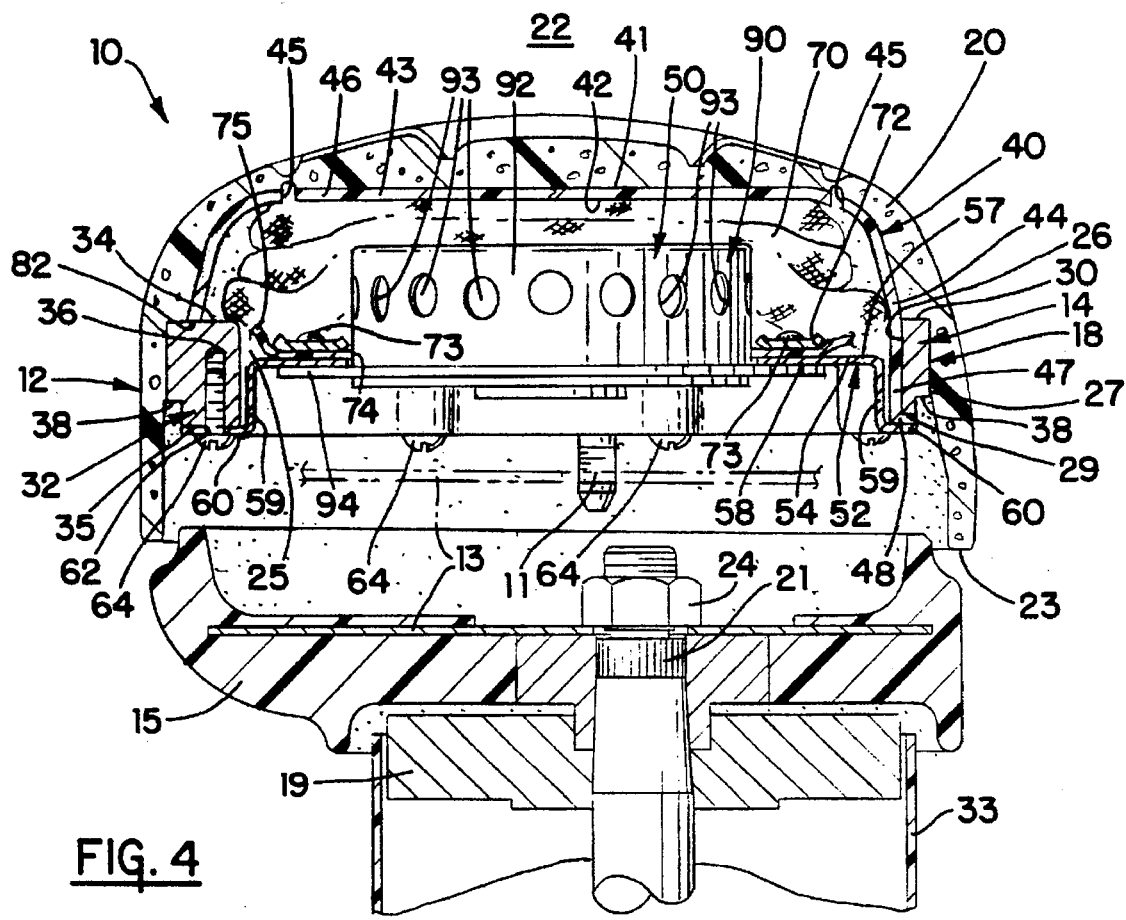
FIG. 4 shows a sectional view of the steering wheel and air bag module assembly of FIG. 3.

Referring to FIGS. 1–5, a vehicle steering wheel and air bag module assembly 10 includes a steering wheel subassembly 12 and an air bag module subassembly 50. The steering wheel subassembly 12 includes a steering wheel 14 having an outer circular rim portion 16, a center frame portion 18, and a plurality of spoke portions 17. The steering wheel subassembly 12 also includes a container 40 snap-fitted to the frame portion 18 of the steering wheel 14, and a preselected outer material 20 continuously molded over the steering wheel 14 and container 40, as described in detail hereinafter. The container 40 is adapted to receive the air bag module subassembly 50 therein. The steering wheel subassembly 12 has an upper driver's side 22 and an opposite lower mounting side 23 as best shown in FIGS. 3 and 4. It is noted that FIGS. 1, 2, 3 and 5 are shown inverted for clarity. In the embodiment being described, the rim portion 16, the frame portion 18, and the spoke portions 17 are integrally manufactured from a die cast magnesium. It will be appreciated however, that the rim portion 16, spoke portions 17, and frame portion 18 may be made of other suitable materials and may be separate pieces that are assembled together, such as by fastening or welding.

The center frame portion 18 defines a receiving area 25 which is capable of receiving the air bag module subassembly 50. The frame portion 18 includes an inner frame surface 26, an outer frame surface 27, a lower frame edge 29 facing the mounting side 23 of the steering wheel subassembly 12 and an upper frame edge 30 facing the driver's side 22 of the steering wheel subassembly 12. The frame portion 18 includes a plurality of bosses 32 spaced apart around the inner frame surface 26. The bosses 32 each project inwardly into the receiving area 25. Each of the bosses 32 includes a generally flat upper boss surface 34 and a generally flat lower boss surface 35. The lower boss surfaces 35 of the bosses 32 extend slightly downward past the lower frame edge 29 for a purpose described hereinafter. Each of the bosses 32 has a threaded boss aperture 36 therein which opens at the lower boss surface 35. In the preferred embodiment, the frame portion 18 defines a generally rectangular receiving area 25, but it should be appreciated that the frame portion 18 could define a receiving area having any predetermined shape. The frame portion 18 also includes an outer shoulder portion 38 positioned outside of the bosses 32, yet inset from the outer frame surface 27 for placement of a seal (not shown) thereon during molding of the outer material 20 of the steering wheel subassembly 12, as described below.

The air bag module subassembly 50 includes a base structure 52, an air bag 70 having an air bag retainer 72, and an inflator 90 for generating gas to inflate the air bag 70. The base structure 52 preferably has a generally rectangular configuration which corresponds to the size and shape of the frame portion 18. The base structure 52 includes a generally planar portion 54 having a central plate opening 56 therein. The planar portion 54 of the base structure 52 has an upper plate surface 57 and an opposite lower plate surface 58. The base structure 52 further includes a plurality of base flanges 59 projecting downwardly away from outer edges of the lower plate surface 58. Each of the base flanges 59 has an outwardly turned lip portion 60 thereon. The lip portions 60 of the base flanges 59 each include a plurality of base apertures 62 spaced for alignment with the respective boss apertures 36 on the bosses 32 of the frame portion 18 to receive a base fastener 64 therethrough to attach the base structure 52 to the frame portion 18, as described further hereinafter. The base flange 59 further includes a plurality of inwardly projecting arcuate depressions 61 corresponding in number and alignment with respective bosses 32 on the frame portion 18 so that the base structure 52 can be inserted within the receiving area 25 of the frame portion 18, as described further hereinafter. The planar portion 54 of the base structure 52 further is adapted to receive a plurality of inflator fasteners 91 therein and a plurality of air bag fasteners 73 therein for mounting the inflator 90 and air bag 70 to the base structure 52, respectively.

An inflator 90 has a generally cylindrical configuration and may be of any conventional construction for generating gas to inflate the air bag 70 upon receiving a predetermined signal from a vehicle sensor (not shown). The inflator 90 includes a main body portion 92 projecting upwardly into the air bag 70 when assembled thereto and having ports 93 therein through which the inflator gas is discharged. The inflator 90 further includes an outwardly projecting inflator flange 94 adapted to engage the lower plate surface 58 of the planar portion 54 of the base structure 52 and to receive inflator fasteners 91 therein to connect the inflator 90 to the base structure 52.

The air bag module subassembly 50 further includes an air bag 70 which may be of a conventional construction. The air bag 70 includes an air bag opening for receiving inflator gas therein. The air bag opening is surrounded by a mouth portion 75 of the air bag 70. The generally circular air bag retainer 72 is attached to the mouth portion 75 of the air bag 70. The air bag retainer 72 is adapted to receive air bag fasteners 73 therethrough to connect the air bag 70 on the upper plate surface 57 of the planar portion 54 of the base structure 52. The air bag 70 is normally stored in a folded condition atop the upper plate surface 57 of the base structure 52 and also atop the inflator 90.

The steering wheel subassembly 12 further includes the container 40 for receiving the air bag module subassembly 50 therein. Advantageously, the container 40 snap-fits onto the center frame portion 18 so that no fasteners are needed to mount the container 40 to the frame portion 18, as described in detail below. The container 40 has a generally rectangular box-like shape and is preferably formed of a single piece of injection molded thermoplastic material. However, the container 40 could be made of any semi-rigid, yet flexible molded material. The container 40 has an outer container surface 41 and an inner container surface 42. The container 40 includes a generally horizontal upper wall 43 and generally vertical side walls 44 extending downwardly from a perimeter of the upper wall 43. The walls 43, 44 include a plurality of slots 45 therein defining door sections 46 which are adapted to be forced open by the deploying air bag 70. The side walls 44 each include a plurality of tabs 47 extending downwardly therefrom. Each of the tabs 47 includes an integral, outwardly projecting hook portion 48. A notch 49 is located between each of the tabs 47. The notches 49 each include a positioning edge 82 which is also a lower edge of the side walls 44. The positioning edges 82 extend between and interconnect each of the tabs 47. The notches 49 correspond in number and spacing with the bosses 32 of the frame portion 18. Preferably, the notches 49 are wider than the bosses 32 so that the bosses 32 may easily be received within the notches 49 when the container 40 is assembled to the frame portion 18. It will be appreciated that the notches 49 and tabs 47 alternate in order around the container 40.

The steering wheel subassembly 12 further includes a preselected outer material 20 which is preferably continuously molded on the rim portion 16, spoke portions 17, and at least the driver's side 22 of the frame portion 18 and on the outer container surface 41 of the upper wall 43 and side walls 44 of the container 40. The outer material 20 advantageously conceals the rim portion 16, the spoke portions 17, the frame portion 18, and also the container 40 snapped in the receiving area 25 of the frame portion 18. As best illustrated in FIG. 4, the outer material 20 includes weakened areas for facilitating deployment of the inflating air bag 70 out through the doors sections 46 of the container 40 and out through the outer material 20. In the preferred embodiment shown, the outer material 20 is urethane foam, but it could be any suitable material which is capable of being integrally formed or molded into one continuous piece on at least the driver's side 22 of the steering wheel subassembly 12. By having a continuously molded outer material 20 on the driver's side 22 of the steering wheel subassembly 12, the necessity of matching the color or gloss of a separate material of a separate air bag module cover is eliminated.

The steering wheel subassembly 12 including the container 40, the continuously molded outer material 20, and the integral steering wheel 14 including the frame portion 18, the rim portion 16, and the spoke portions 17 is preferably assembled as follows. The container 40 is aligned with the driver's side 22 of the steering wheel 14 as shown in FIG. 1 such that the notches 49 in the container 40 are aligned with respective bosses 32 in the frame portion 18. The side walls 44 of the container 40 with the tabs 47 leading are inserted into the receiving area 25 of the center frame portion 18 from the driver's side 22. The spaced apart tabs 47 easily deflect inwardly so that the hook portions 48 of the tabs 47 can pass through the receiving area 25 and the tabs 47 are positioned adjacent the inner frame surface 26. Insertion of the container 40 into the receiving area 25 is limited by contact of the positioning edge 82 of the notches 49 with the upper boss surfaces 34 of the bosses 32, thus vertically positioning the container 40 relative the frame portion 18. Once the container 40 has been inserted as far as the bosses 32 will allow, the hook portions 48 of the tabs 47 are positioned between the respective bosses 32 of the frame portion 18 and can be snapped over the lower frame edge 29 of the frame portion 18. The engagement of the hook portions 48 with lower frame edge 29 of the frame portion 18 also prevents the container 40 from vertical movement relative the frame portion 18 and also positions the container 40. Thus, engagement of the positioning edges 82 of the notches 49 with the upper boss surfaces 34 and engagement of the hook portions 48 of the tabs 47 with the lower frame edge 29 cooperatively vertically position and positively lock the container 40 on the frame portion 18. It will be appreciated that the bosses 32 on the frame portion 18 and the tabs 47 with hook portions 48 and the alternating notches 49 therebetween cooperatively allow the container 40 to be easily snapped into place on the frame portion 18 and securely held in position on the frame portion 18 without the use of any fasteners. It will further be appreciated that when the container 40 is assembled to the frame portion 18, the hook portions 48 do not project further downwardly away from the lower frame edge 29 any more than the lower boss surfaces 35 so that the lip portions 60 of the base structure 52 can later be aligned with and engage the lower boss surfaces 35 of the bosses 32, as described further below. It will further be appreciated that the container 40 could be inserted into the frame portion 18 from the mounting side 23 but it is easier to insert from the driver's side 22 since only the tabs 47 need to pass into the receiving area 25 of the frame portion 18.

After snap-fitted attachment of the container 40 to the frame portion 18, the outer material 20 is continuously molded onto the rim portion 16, the spoke portions 17, the driver's side 22 of the frame portion 18, and the upper walls 43 and side walls 44 of the outer container surface 41. The steering wheel 14 and the snap-fitted container 40 are placed in a mold and the seal is placed on the outer shoulder portion 38 of the frame portion 18 to prevent the molded outer material 20 from covering the bosses 32 and the inner container surface 42. Advantageously, the outer material 20 is easily kept off the tabs 47 of the container 40 since the container 40 is already attached to the frame portion 18. As best shown in FIG. 2, this completes the steering wheel subassembly 12 to which the air bag module subassembly 50 can now be assembled. Advantageously, the entire steering wheel subassembly 12 is formed without the use of any fasteners. Also advantageously, the steering wheel subassembly 12 provides an aesthetically pleasing driver's side 22 which is a continuously molded outer material 20 without any seams showing from a separate air bag module cover.

Figure 5:
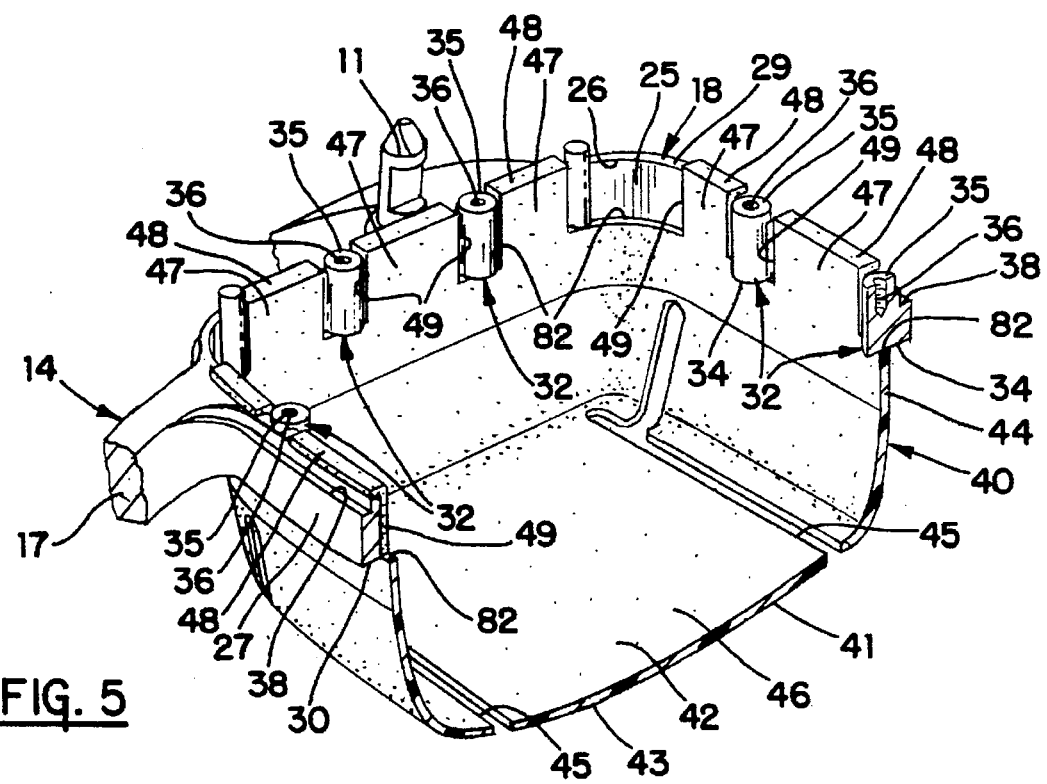
FIG. 5 is a perspective view of the container snapped onto the frame portion and showing the frame portion partially broken away and the container partially broken away.

With reference to FIGS. 4 and 5, the air bag module subassembly 50 is preferably assembled as follows. The air bag 70 is assembled to the base structure 52 in any suitable manner. For example, the air bag retainer 72 is assembled to the mouth portion 75 of the air bag 70. The air bag retainer 72 and air bag 70 are attached to the planar portion 54 of the base structure 52 by a plurality of air bag fasteners 73. The air bag 70 is suitably folded atop the upper plate surface 57. The main body portion 92 of the inflator 90 is then inserted into the plate opening 56 from a rear side of the base structure 52 until the inflator flange 94 engages the lower plate surface 58. The inflator 90 is then suitably attached to the base structure 52 in any suitable manner, such as by a plurality of inflator fasteners 91, to complete the air bag module subassembly 50.

Next, the air bag module subassembly 50 is easily assembled to the steering wheel subassembly 12 to provide the steering wheel and air bag module assembly 10 as follows. Referring to FIG. 3, the base apertures 62 are aligned with respective boss apertures 36 in the bosses 32 of the frame portion 18 and the folded air bag 70 and inflator 90 are inserted into the container 40. A plurality of base fasteners 64 are inserted through each of the base apertures 62 and respective boss apertures 36 to secure the base structure 52, and thus the entire air bag module subassembly 50, to the steering wheel subassembly 12.

The steering wheel and air bag module assembly 10 is then suitably mounted to the vehicle. For example, the steering wheel and air bag module assembly 10 includes mounting members 11 for attachment to a support plate 13 molded-in atop a molded plastic hub portion 15. The hub portion 15 is suitably mounted on a steering column 19 such as by a splined fastener 21 secured to the support plate 13 by a nut 24. A shroud 33 may surround the steering column 19.

It will be appreciated that the present invention provides an improved steering wheel and air bag module assembly 10 in which the container 40 and continuously molded outer material 20 provide a covering for the air bag module subassembly 50. It will further be appreciated that the frame portion 18 and the container 40 may be preassembled with the steering wheel subassembly 12 instead of with the air bag module subassembly 50. However, the frame portion 18, container 40 and molded outer material 20 could also be included in the air bag module subassembly 50 and then mounted to the steering wheel 14. It will further be appreciated that the container 40 is snap-fittedly attached to the frame portion 18 without the use of fasteners. Also advantageously, the assembly of the base structure 52 further captures the container 40 on the frame portion 18 to securely hold the container 40 in position during forces associated with air bag deployment. Also advantageously, the continuously molded outer material 20 provides a smooth continuous appearance on the driver's side 22 of the steering wheel and air bag module assembly 10. Advantageously, the container 40 and the molded outer material 20 applied to the container 40 do not need to be manipulated or bent after being molded since they are already mounted to the frame portion 18. For example, the side walls 44 of the container 40 do not need to be stretched out to insert the air bag module subassembly 50 therein as in the prior art. Thus, opening slots on the corners of the container 40 and molded outer material 20 are eliminated.

It will be understood that a person skilled in the art may make modifications to the preferred embodiment shown herein within the scope and intent of the claims. For example, although the preferred embodiment shows the frame portion 18 being an integral portion of a die cast steering wheel 14, it will be appreciated that the frame portion can be provided separate from the rim portion 16 and spoke portions 17. For example, the frame portion can be a separate component to which the container 40 is attached. Next, the molded outer material is continuously molded over the container 40 and frame portion. Then, the air bag module subassembly 50 including the air bag 70 and base structure 52 can be inserted into the container 40 and attached to the frame portion. The inflator 90 can be attached to the base structure 52 either before or after attachment of the base structure 52 to the frame portion. Finally, the container 40, frame portion, and overlying molded outer material along with the air bag module subassembly 50 attached thereto can be suitably mounted to a steering wheel of a vehicle. Thus, the advantages associated with not having to manipulate or bend open the sides of the container 40 to insert the air bag module subassembly 50 therein are also gained when the frame portion is not manufactured integral with the steering wheel.

While the present invention has been described as carded out in a specific embodiment thereof, it is not intended to be limited thereby but is intended to cover the invention broadly within the scope and spirit of the claims.

What is claimed is:

1. An air bag module assembly for attachment to a steering wheel, the assembly comprising:
   an air bag subassembly including an air bag;
   a container for receiving the air bag subassembly therein;
   a frame portion for attachment to the steering wheel;
   means for snap-fittedly attaching the container to the frame portion, the means for snap-fittedly attaching the container to the frame portion including a plurality of bosses on the frame portion and a plurality of alternating tabs and notches on the container, the plurality of bosses being generally circular raised portions projecting inwardly on the frame portion, the tabs each including an outwardly projecting hook portion thereon and wherein the bosses are received in the notches and the hook portions are snapped onto the frame portion; and
   an outer material formed as an integral one-piece covering over the frame portion and the container.

2. The assembly of claim 1 wherein the bosses each include an upper surface and an opposite lower surface and wherein the container has notch edges engaging the upper surfaces of the bosses and wherein the tabs extend between the bosses and the hook portions are snapped onto the frame portion between the lower surfaces of the bosses whereby the bosses, notch edges, and hook portions cooperatively lock the container on the frame portion.

3. An air bag module assembly for attachment to a steering wheel, the assembly comprising:
   an air bag subassembly including a base structure, and including an air bag attached to the base structure;
   a frame portion for attachment to the steering wheel, the frame portion defining a receiving area, the time portion including a plurality of bosses projecting inwardly towards the receiving area; and
   a container for receiving the air bag subassembly therein, the container having a plurality of alternating tabs and notches thereon, the tabs each including an outwardly projecting hook portion thereon, the container for insertion into the receiving area of the frame portion, the notches adapted for receiving the bosses therein when the container is inserted into the receiving area of the frame portion and the hook portions adapted to snap onto the frame portion whereby the container is snap-fittedly attached to the frame portion.

4. The assembly of claim 3 wherein the base structure is attached to the frame portion.

5. The assembly of claim 3 whereto the assembly includes an outer material formed as an integral one-piece covering over the frame portion and the container.

6. The assembly of claim 3 wherein the bosses each include an upper surface and an opposite lower surface and wherein the container has notch edges engaging the upper surfaces of the bosses and wherein the tabs extend between the bosses and the hook portions are snapped onto the frame portion between the lower surfaces of the bosses whereby the bosses, notch edges, and hook portions cooperatively lock the container on the frame portion.

7. The assembly of claim 6 wherein the base structure includes a plurality of depressions aligned for receiving the bosses therein when the base structure is attached to the frame portion.

8. The assembly of claim 4 wherein each of the bosses includes a boss aperture therein and wherein the base structure includes base apertures aligned with respective boss apertures and wherein the assembly includes fasteners extending through the boss apertures and the base apertures to attach the base structure to the frame portion.

9. The assembly of claim 6 wherein the hook portions of the container are trapped between the base structure and the frame portion when the base structure is attached to the frame portion.

10. A method of making an air bag module assembly for attachment to a steering wheel comprising the steps of:
    providing an air bag subassembly including a base structure and an air bag attached to the base structure;
    providing a frame portion having a receiving area;
    inserting a container into the receiving area and snapping the container onto the frame portion prior to attaching the base structure to the frame portion;
    inserting the air bag subassembly into the container after snapping the container onto the frame portion; and
    attaching the base structure of the air bag subassembly to the frame portion after snapping the container onto the frame portion.

11. The method of claim 10 further comprising the step of trapping the container between the base structure and the frame portion when inserting the air bag subassembly into the container.

12. The method of claim 10 further comprising the step of attaching the frame portion to the steering wheel prior to attaching the container to the frame portion.

13. The method of claim 10 further comprising the step of covering the frame portion and the container with an outer material formed as one integral piece over the container and frame portion prior to insertion of the air bag subassembly into the container.

14. The method of claim 10 further comprising the steps of integrally forming the frame portion with a rim portion and spoke portions of the steering wheel; and continuously molding an outer material over the container, frame portion, spoke portions and rim portion prior to insertion of the air bag subassembly into the container.

15. The method of claim 10 further comprising the steps of providing the container with a plurality of tabs having hook portions thereon; and snapping the hook portions onto the frame portion.

* * * * *